(12) United States Patent
Sung et al.

(10) Patent No.: US 7,931,333 B2
(45) Date of Patent: Apr. 26, 2011

(54) AUTOMOTIVE SEAT CUSHION WITH DRAIN DEVICE

(75) Inventors: Young Bok Sung, Hwaseong-si (KR); Hyeong Jun Kim, Anyang-si (KR); Jae Hyun Na, Ansan-si (KR); Chang Ju Gi, Seoul (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 12/621,202

(22) Filed: Nov. 18, 2009

(65) Prior Publication Data

US 2010/0289304 A1 Nov. 18, 2010

(30) Foreign Application Priority Data

May 13, 2009 (KR) .................... 10-2009-0041552

(51) Int. Cl.
*A47C 31/12* (2006.01)
*A47C 7/02* (2006.01)

(52) U.S. Cl. ................... 297/217.2; 297/452.21

(58) Field of Classification Search ............ 297/217.2, 297/217.3, 452.21, 452.22, 452.58, 452.6, 297/463.2, 452.42, 452.46
See application file for complete search history.

(56) References Cited

U.S. PATENT DOCUMENTS

| 4,452,488 | A | * | 6/1984 | Rugienius | 297/452.6 |
| 4,558,905 | A | * | 12/1985 | Natori | 297/452.6 |
| 5,522,645 | A | * | 6/1996 | Dahlbacka | 297/452.55 |
| 7,436,315 | B2 | * | 10/2008 | Kamizono et al. | 340/667 |
| 2008/0191524 | A1 | * | 8/2008 | Takai et al. | 297/217.2 |

* cited by examiner

*Primary Examiner* — Milton Nelson, Jr.
(74) *Attorney, Agent, or Firm* — Morgan, Lewis & Bockius LLP

(57) ABSTRACT

An automotive seat cushion with a drain device may include a seat cushion including a cushion pad which is disposed inside the seat cushion and a covering which is disposed outside the cushion pad and is connected to the cushion pad by a hog ring, a passenger classification sensor which is disposed between the cushion pad and the covering and detects whether a seat is occupied by an occupant or not, a drain hole which is formed by vertically penetrating the seat cushion, and a drain hole guide member which is inserted into the drain hole and engaged thereto to maintain a shape of the drain hole.

14 Claims, 5 Drawing Sheets

US 7,931,333 B2

AUTOMOTIVE SEAT CUSHION WITH DRAIN DEVICE

CROSS-REFERENCE TO RELATED APPLICATION

The present application claims priority to Korean Patent Application Number 10-2009-0041552 filed May 13, 2009, the entire contents of which application is incorporated herein for all purposes by this reference.

BACKGROUND OF THE INVENTION

1. Field of the Invention

The present invention relates to an automotive seat cushion with a drain device, and more particularly, to an automotive seat cushion with a drain device which is configured such that water gathered to a seat cushion is easily guided and drained to a floor under a seat.

2. Description of Related Art

Generally, an occupant classification sensor detects weight, form and seating position of an occupant by pressure distribution of an automotive seat which is measured by a pressure sensor or the like when specific load acts, and is used as a part of an airbag system of a vehicle to enhance safety of an occupant.

Such an occupant classification sensor is installed between an upper portion of a cushion pad of a seat and a covering, and is grounded to a vehicle body to form a detection sensor and a capacitance circuit with two electrodes of a vehicle body.

Since, if a seat is occupied by an occupant, dielectric constant between the detection sensor and the vehicle body is varied and capacitance is determined according to the same, the occupant classification sensor detects whether the seat is occupied by an occupant or not by measuring current at this time.

Accordingly, if whether there is an occupant or not is checked using electric current measured by the detection sensor, a signal is input to an airbag ECU which determines deploy of an airbag, and accordingly, an airbag for a seat which is occupied by an occupant is deployed in the case of an accident.

However, the occupant classification sensor which is configured in this way is weak to water since it detects an occupant using electric current.

That is, as shown in moisture performance test result shown in FIG. 7, in case that water contacts the occupant classification sensor in a seat, the occupant classification sensor may malfunction so that it cannot classify an adult and an infant, and so it cannot meet automotive regulation.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an automotive seat cushion with a drain device which includes a drain hole which vertically penetrates the seat cushion such that water gathered in the seat cushion can be guided to a floor under the seat to drain and a drain hole guide member which is inserted into the drain hole and maintains the shape of the drain hole.

In an aspect of the present invention, the automotive seat cushion with a drain device, may include a seat cushion including a cushion pad which is disposed inside the seat cushion and a covering which is disposed outside the cushion pad and is connected to the cushion pad by a hog ring, a passenger classification sensor which is disposed between the cushion pad and the covering and detects whether a seat is occupied by an occupant or not, a drain hole which is formed by vertically penetrating the seat cushion, and a drain hole guide member which is inserted into the drain hole and engaged thereto to maintain a shape of the drain hole.

The drain hole may be positioned at a wire mounting groove formed in the cushion pad and a pad insert wire coupled to the cushion pad may be disposed in the drain hole and connected to the covering by the hog ring, wherein the drain hole is formed in a shape of a slot hole along the wire mounting groove.

The drain hole guide member may include a groove mounting portion which has a plate shape to which a through hole is formed to drain water at a center portion thereof, wherein the groove mounting portion is placed in the wire mounting groove to support the drain hole guide member, a hole shape maintaining portion which has plate shapes being apart each other and extending downwardly from a lower surface of the groove mounting portion by predetermined lengths, and a wire fixing portion which is provided at an upper surface of the groove mounting portion and is formed to be selectively fixed to a covering insert wire connected to the covering.

The pas insert wire and the covering insert wire may be coupled by the hog ring, wherein the hole shape maintaining portion includes two plate portions being apart each other and end portions thereof are formed of free end, wherein the covering includes a cloth which wraps the covering insert wire and is partially cut to connect the covering insert wire of the covering to the wire fixing portion therethrough by the hog ring, wherein the covering insert wire is disposed between the plate shapes of the hole shape maintaining portion and coupled thereto, and wherein the wire fixing portion includes at least a hook formed upwards from the upper surface of the groove mounting portion.

In another aspect of the present invention, the drain hole guide member may include a groove mounting portion which has a plate shape to which a through hole is formed to drain water at a center portion thereof, a hole shape maintaining portion which has plate shapes being apart each other and extending from a lower surface of the groove mounting portion downwardly by predetermined lengths, and a wire fixing portion which is provided at an upper portion of the groove mounting portion and is formed to be fixed to at least one of a pad insert wire and a covering insert wire, wherein the pad insert wire is connected to the cushion pad and the covering insert wire is connected to the covering, wherein the hole shape maintaining portion includes two plate portions being apart each other and end portions thereof are formed of free end, wherein the covering includes a cloth which wraps the covering insert wire and is partially cut to connect the covering insert wire of the covering to the wire fixing portion coupled to the pad insert wire therethrough by the hog ring, and wherein at least one of the pad insert wire and the covering insert wire extends along the lower surface of the drain hole guide member.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
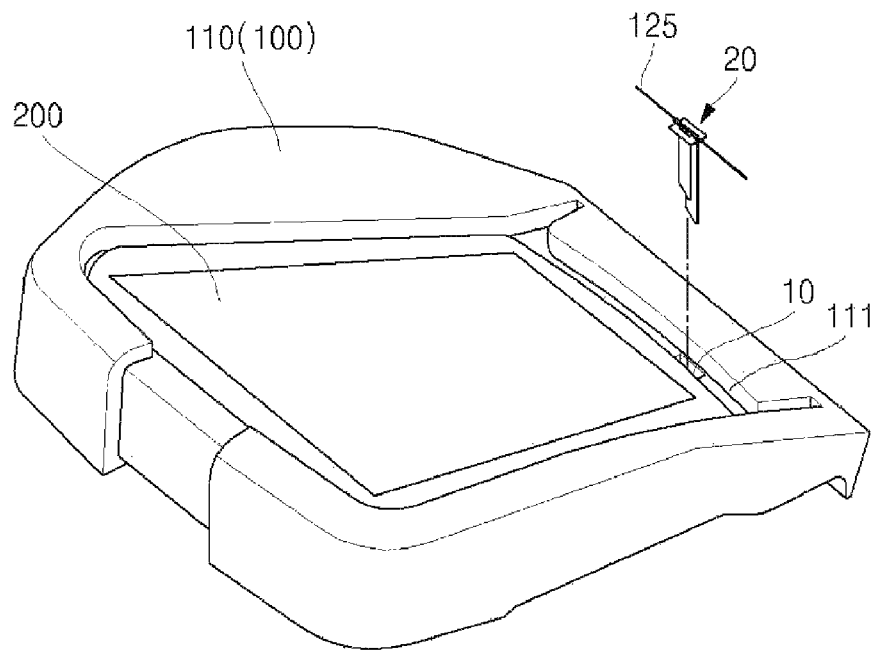
FIG. 1 is a drawing showing a seat cushion and a drain hole guide member according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Various exemplary embodiments of the present invention will hereinafter be described in detail with reference to the drawing.

Figure 2:
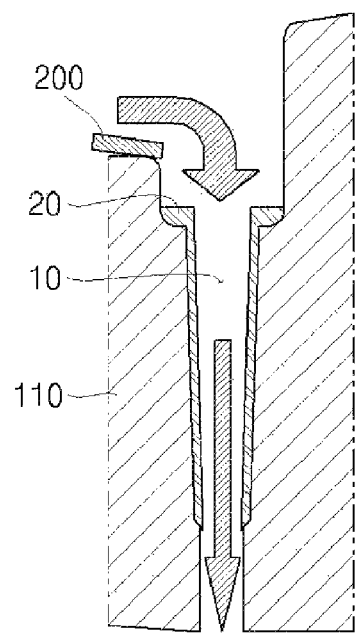
FIG. 2 is a sectional view showing a drain hole guide member which is installed to a drain hole according to an exemplary embodiment of the present invention.
Figure 3:
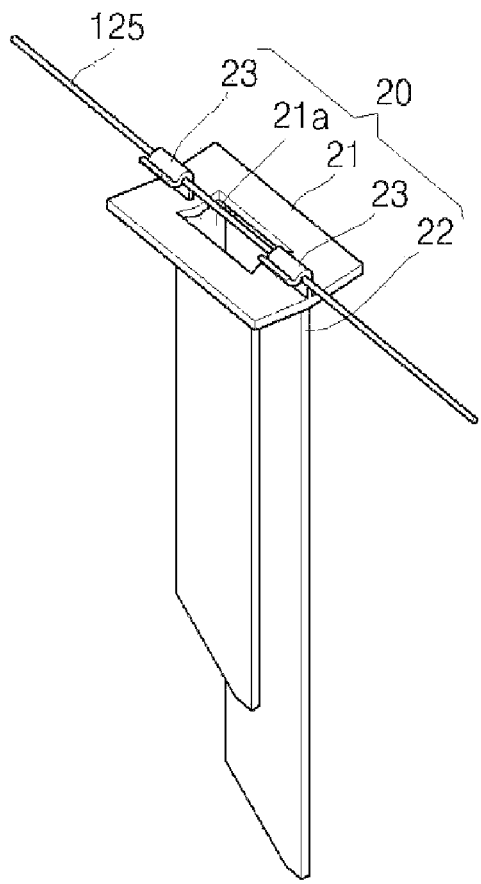
FIG. 3 is a perspective view of a drain hole guide member according to an exemplary embodiment of the present invention.

FIG. 1 is a drawing showing a seat cushion and a drain hole guide member according to an exemplary embodiment of the present invention, FIG. 2 is a sectional view showing a drain hole guide member which is installed to a drain hole according to an exemplary embodiment of the present invention, and FIG. 3 is a perspective view of a drain hole guide member according to an exemplary embodiment of the present invention.

Figure 4:
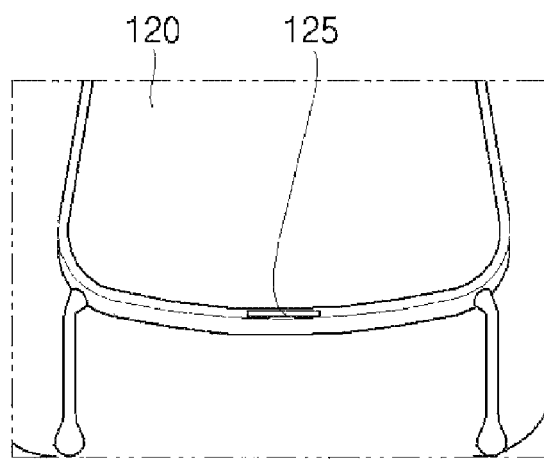
FIG. 4 is a drawing showing a covering and a covering insert wire according to an exemplary embodiment of the present invention.
Figure 5:
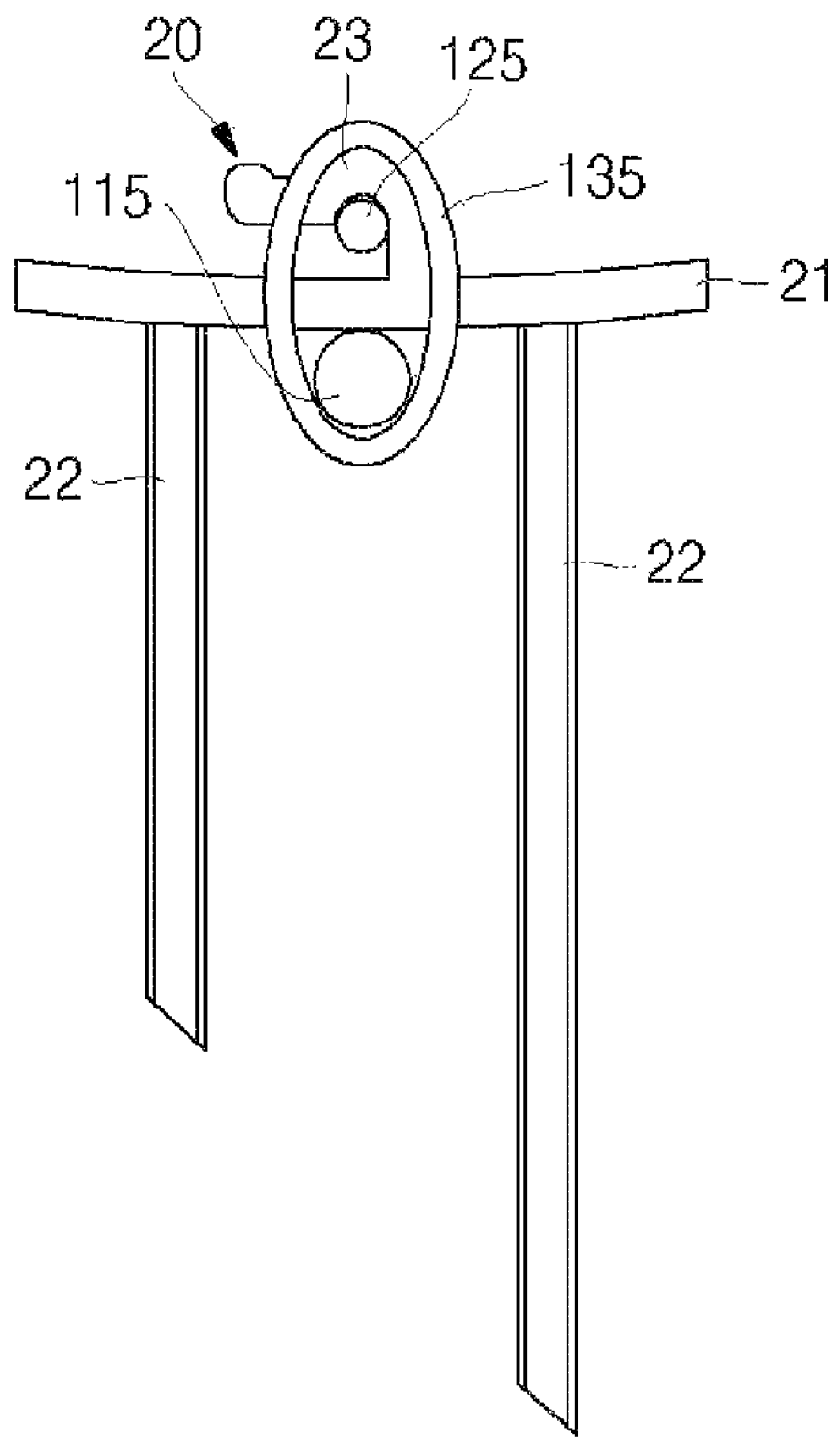
FIG. 5 is a sectional view showing assembling structure of a wire in an automotive seat cushion and a drain hole guide member according to an exemplary embodiment of the present invention.

FIG. 4 is a drawing showing a covering and a covering insert wire according to an exemplary embodiment of the present invention, and FIG. 5 is a sectional view showing assembling structure of a wire in an automotive seat cushion and a drain hole guide member according to an exemplary embodiment of the present invention.

In an automotive seat cushion provided with a drain device according to an exemplary embodiment of the present invention, a seat cushion 100 which is connected to a seat back (not shown) in a seat of an automotive is configured to drain water gathered to the seat cushion 100 to a floor of an automotive and to remove the same by forming a drain hole 10 in the seat cushion 100, in case that a seat is occupied by a wet passenger or water is poured out on a seat, in order to improve the defect of a passenger classification sensor 200 to moisture, which is installed between a cushion pad 110 and a covering 120 which are coupled to each other by a hog ring method.

The seat of an automotive may be various seats, but in particular, preferably be a driver seat or a front passenger seat.

The cushion pad 110 is disposed inside the seat cushion 100 and is formed with elastic material such as a sponge to perform function of maintaining the shape of the seat cushion 100, the covering 120 is formed with cloth, leather, artificial leather, or the like and performs function of wholly or partially wrapping the outside of the cushion pad 110, and the pad and the covering 120 are coupled by a hog ring method.

In the seat cushion 100 which is formed as such, as shown in FIG. 1 and FIG. 2, the drain hole 10 is formed by vertically penetrating the seat cushion 100. However, there may be a problem that the cushion pad 110 may be torn by the drain hole 10, and also a problem that the drain hole 10 may be blocked by weight of a passenger when a passenger sits so that the drain hole 10 cannot drain water. In order to solve these problems, a drain hole guide member 20 which is inserted into the drain hole 10 and maintains the shape of the drain hole 10 is provided.

The drain hole 10 has a slot hole shape, and is formed in a wire mounting groove 111 at which a pad insert wire 115 which is disposed inside the cushion pad 110 may be positioned.

The wire mounting groove 111 is formed at a boundary line between the seating position of the seat cushion 100, that is, a center part of the seat cushion 100 and a bolster, and at a boundary line between the seat cushion 100 and the seat back (not shown), and is a groove with a constant depth to which the pad insert wire 115 is inserted, and the pad insert wire 115 is bound to a covering insert wire 125 which is disposed inside the covering 120 in the wire mounting groove 111 by a hog ring process, so as to give a voluminous effect to the covering 120 wrapping the cushion pad 110.

At this time, the pad insert wire 115 is inserted into the cushion pad 110 and the covering insert wire 125 is wrapped by cloth at a seam line of the covering 120, so the pad insert wire 115 and the covering insert wire 125 are faced each other to be bound by a hog ring 135 in order to assemble the covering 120 to the cushion pad 110.

At this time, the bound wires 115 and 125 are disposed within the wire mounting groove 111 not to be exposed to the outside.

The drain hole guide member 20, as shown in FIG. 3, includes a groove mounting portion 21 which has a plate shape to which a through hole 21a is formed to drain water at a center thereof, a hole shape maintaining portion 22 which has plate shapes extending downwardly by predetermined lengths in a state of being apart from each other, and a wire fixing portion 23 which is provided at both sides of the upper portion of the groove mounting portion 21 and has a hook shape to be fixed to the covering insert wire 125.

The drain hole guide member 20 which is configured as such has a structure in which the groove mounting portion 21 is disposed into the wire mounting groove 111, the hole shape maintaining portion 22 is inserted into the drain hole 10 to be fixed thereto, and the covering insert wire 125 which is inserted into the wire mounting groove 111 is hooked to the wire fixing portion 23 to be fixed thereto.

At this time, since the covering insert wire 125, as shown in FIG. 4, is wrapped by cloth at the seam line of the covering 120, it is preferable that the covering insert wire 125 is exposed to the outside in a state of partially cutting cloth and is then fixed to the wire fixing portion 23.

Further, as shown in FIG. 5, the pad insert wire 115 as well as the covering insert wire 125 extend through the drain hole guide member 20, so it is preferable that the covering insert wire 125 extends along a lower surface of the groove mounting portion 21 and the covering insert wire 125 and the pad insert wire 115 are faced to each other are then bound by the hog ring 135.

As such, by inserting the groove mounting portion 21 and the hole shape maintaining portion 22 of the drain hole guide member 20, and by facing the covering insert wire 125 and the pad insert wire 115 to each other and then binding the same using the hog ring 135, in a state that the wire fixing portion 23 of the drain guide member 20 is hooked to the covering insert wire 125 using the conventional assembling method of assembling the cushion pad 110 and the covering 120 using the hog ring 135, the drain hole guide member 20 can be firmly fixed to the cushion pad 110.

Accordingly, according to the present invention, water is drained through the drain hole 10 instead of being gathered to the seat, so malfunction of the passenger classification sensor 200 which is weak to moisture can be prevented so as to prevent an airbag not being deployed.

In addition, since the drain hole guide member 20 is disposed in the drain hole 10, it can be prevented that the drain hole 10 is blocked by weight of a passenger and the cushion pad 110 is torn by the drain hole 10, so performance of water drain and durability can be enhanced.

Figure 6:
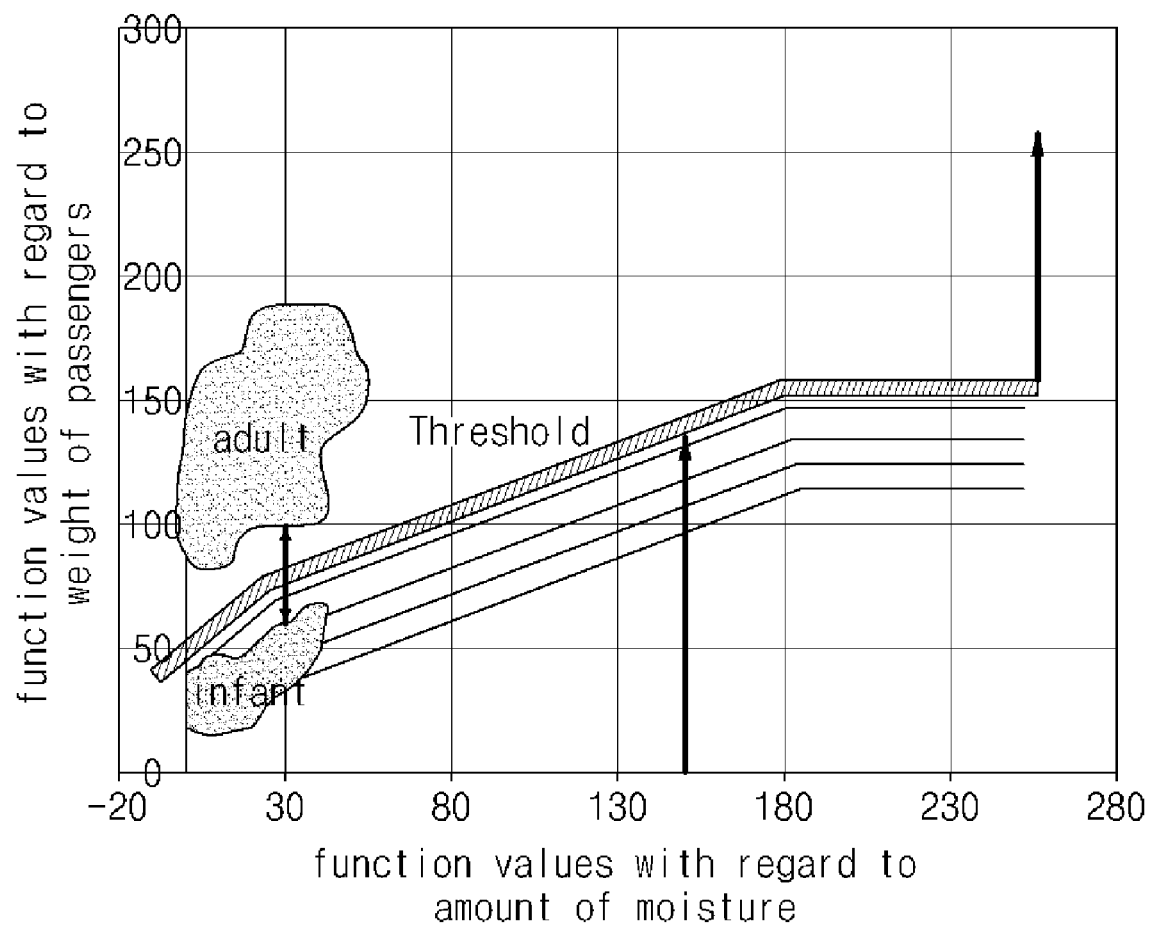
FIG. 6 is a graph showing a moisture performance test result for an automotive seat cushion provided with a drain device according to an exemplary embodiment of the present invention.
Figure 7:
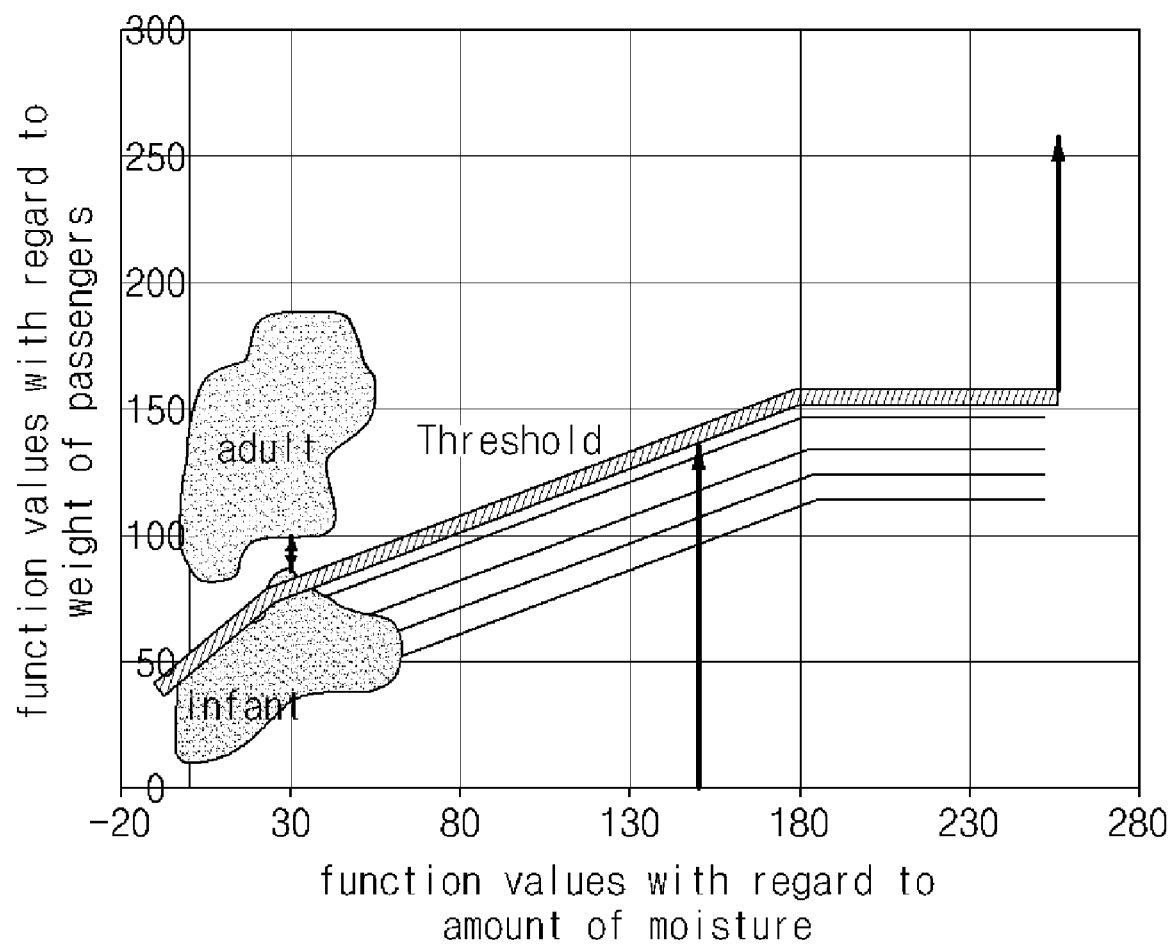
FIG. 7 is a graph showing a moisture performance test result for a conventional automotive seat.

Meanwhile, FIG. 6 is a graph showing a moisture performance test result for an automotive seat cushion provided with a drain device according to an exemplary embodiment of the present invention, and the passenger classification sensor 200 can normally classify an adult and an infant on the basis of Y-axis which is comprised of function vales with regard to weight of passengers and X-axis which is comprised of function values with regard to amount of moisture, so as to meet automotive regulations.

As described above, according to an automotive seat cushion with a drain device according to an exemplary embodiment of the present invention, since water can be drained to a floor under the seat through the drain hole and the drain hole guide member even when a lot of water is poured to the seat, it is difficult for a passenger classification sensor which is weak to moisture to contact water so as to enhance durability of a passenger classification sensor, and thereby making a passenger classification sensor normally operate so as to prevent an airbag from not being deployed by failure of passenger detection.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automotive seat cushion with a drain device, comprising:
    a seat cushion including a cushion pad which is disposed inside the seat cushion and a covering which is disposed outside the cushion pad and is connected to the cushion pad by a hog ring;
    a passenger classification sensor which is disposed between the cushion pad and the covering and detects whether a seat is occupied by an occupant or not;
    a drain hole which is formed by vertically penetrating the seat cushion; and
    a drain hole guide member which is inserted into the drain hole and engaged thereto to maintain a shape of the drain hole.

2. The automotive seat cushion of claim 1, wherein the drain hole is positioned at a wire mounting groove formed in the cushion pad and a pad insert wire coupled to the cushion pad is disposed in the drain hole and connected to the covering by the hog ring.

3. The automotive seat cushion of claim 2, wherein the drain hole is formed in a shape of a slot hole along the wire mounting groove.

4. The automotive seat cushion of claim 2, wherein the drain hole guide member comprises:
    a groove mounting portion which has a plate shape to which a through hole is formed to drain water at a center portion thereof, wherein the groove mounting portion is placed in the wire mounting groove to support the drain hole guide member;
    a hole shape maintaining portion which has plate shapes being spaced apart from each other and extending downwardly from a lower surface of the groove mounting portion by predetermined lengths; and
    a wire fixing portion which is provided at an upper surface of the groove mounting portion and is formed to be selectively fixed to a covering insert wire connected to the covering, wherein the pad insert wire and the covering insert wire are coupled by the hog ring.

5. The automotive seat cushion of claim 4, wherein the hole shape maintaining portion includes two plate portions being spaced apart from each other.

6. The automotive seat cushion of claim 4, wherein the covering includes a cloth which wraps the covering insert wire and is partially cut to connect the covering insert wire of the covering to the wire fixing portion therethrough by the hog ring.

7. The automotive seat cushion of claim 4, wherein the covering insert wire is disposed between the plate shapes of the hole shape maintaining portion and coupled thereto.

8. The automotive seat cushion of claim 4, wherein the wire fixing portion includes at least a hook formed upwards from the upper surface of the groove mounting portion.

9. The automotive seat cushion of claim 1, wherein the drain hole is formed in a shape of a slot hole.

10. The automotive seat cushion of claim 1, wherein the drain hole guide member comprises:
    a groove mounting portion which has a plate shape to which a through hole is formed to drain water at a center portion thereof;
    a hole shape maintaining portion which has plate shapes being spaced apart from each other and extending from a lower surface of the groove mounting portion downwardly by predetermined lengths; and a wire fixing portion which is provided at an upper portion of the groove mounting portion and is formed to be fixed to at least one of a pad insert wire and a covering insert wire, wherein the pad insert wire is connected to the cushion pad and the covering insert wire is connected to the covering.

11. The automotive seat cushion of claim 10, wherein the hole shape maintaining portion includes two plate portions being spaced apart from each other.

12. The automotive seat cushion of claim 10, wherein the covering includes a cloth which wraps the covering insert wire and is partially cut to connect the covering insert wire of the covering to the wire fixing portion coupled to the pad insert wire therethrough by the hog ring.

13. The automotive seat cushion of claim 10, wherein at least one of the pad insert wire and the covering insert wire extends along the lower surface of the drain hole guide member.

14. The automotive seat cushion of claim 1, wherein the drain hole guide member is inserted into the drain hole and a pad insert wire fixed to the cushion pad and a covering insert wire connected to the covering are bound to each other by the hog ring.

* * * * *